United States Patent
Croak et al.

(10) Patent No.: US 7,995,709 B2
(45) Date of Patent: *Aug. 9, 2011

(54) METHOD AND APPARATUS FOR USING A SINGLE LOCAL PHONE NUMBER FOR ROUTING OUT OF AREA PHONE NUMBERS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 11 days.

This patent is subject to a terminal disclaimer.

(21) Appl. No.: 12/574,548

(22) Filed: Oct. 6, 2009

(65) Prior Publication Data

US 2010/0020793 A1    Jan. 28, 2010

Related U.S. Application Data

(63) Continuation of application No. 11/240,900, filed on Sep. 30, 2005, now Pat. No. 7,602,887.

(51) Int. Cl.
*H04M 11/00* (2006.01)

(52) U.S. Cl. ........................................ 379/45; 370/352

(58) Field of Classification Search .................... 379/45, 379/37, 90.01; 370/352
See application file for complete search history.

(56) References Cited

U.S. PATENT DOCUMENTS

| 7,079,627 B2 * | 7/2006 | Crago et al. ................. 379/45 |
| 7,330,464 B2 * | 2/2008 | Brouwer et al. ............. 370/352 |
| 7,366,157 B1 * | 4/2008 | Valentine et al. ............ 370/352 |
| 7,602,887 B1 * | 10/2009 | Croak et al. .................. 379/45 |
| 7,734,021 B1 * | 6/2010 | Croak et al. .................. 379/45 |
| 2005/0249193 A1 * | 11/2005 | Epley ........................... 370/352 |

* cited by examiner

*Primary Examiner* — Stella L Woo

(57) ABSTRACT

A method and apparatus for providing a single shadow number to be associated with one or more out of area phone numbers that have registered service addresses in the same local area. For instance, if multiple subscribers with service addresses within the same local calling area choose to use out of area phone numbers, these multiple out of area phone numbers will all be associated with a single shadow phone number that is local within the local calling area. In one embodiment, when a subscriber using an out of area phone number places an E911 call, the out of area phone number as well as the associated shadow number will be sent to the E911 PSAP.

18 Claims, 5 Drawing Sheets ions that are common to the figures.

METHOD AND APPARATUS FOR USING A SINGLE LOCAL PHONE NUMBER FOR ROUTING OUT OF AREA PHONE NUMBERS

This application is a continuation of U.S. patent application Ser. No. 11/240,900, filed Sep. 30, 2005 now U.S. Pat. No. 7,602,887, currently allowed, which is herein incorporated by reference in its entirety.

The present invention relates generally to communication networks and, more particularly, to a method and apparatus for providing a single local phone number for routing out of area phone numbers to a correct Public Safety Answering Point (PSAP) in communication networks, e.g., packet networks such as Voice over Internet Protocol (VoIP) networks.

BACKGROUND OF THE INVENTION

Subscribers of VoIP services sometimes choose telephone numbers outside of their geographical local calling area. Enhanced 911 (E911) services, however, require that the subscriber's telephone number and service address must be based in the same local calling area. For instance, subscribers must be assigned a phone number that is within the local calling area of subscriber's registered service address. When subscribers choose a phone number outside of their local calling area based on their service addresses, these subscribers are not eligible for E911 services. More importantly, the ineligibility of E911 services prevents subscribers with out of area phone number from receiving help using their subscribed VoIP services in an emergency situation.

Therefore, a need exists for a method and apparatus for enabling a single local phone number for routing out of area phone numbers to a correct Public Safety Answering Point (PSAP) in a packet network, e.g., a VoIP network.

SUMMARY OF THE INVENTION

In one embodiment, the present invention enables a single shadow numbers to be associated with one or more out of area phone numbers that have registered service addresses in the same local area. For instance, if multiple subscribers with service addresses within the same local calling area choose to use out of area phone numbers, these multiple out of area phone numbers will all be associated with a single shadow phone number that is local within the local calling area. When a subscriber using an out of area phone number places an E911 call, the out of area phone number as well as the associated shadow number will be sent to the E911 PSAP. Since telephone numbers are precious commodities that are limited in supply, the present invention enables a single shadow phone number to be associated with all out of area subscribers within a single local calling area. In one embodiment, the shadow number is used only for routing E911 calls to the right PSAP. Therefore, the shadow phone number does not have to be unique and can be associated with multiple out of area numbers as long as registered service addresses of the out of area phone numbers belong to the same local calling area.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
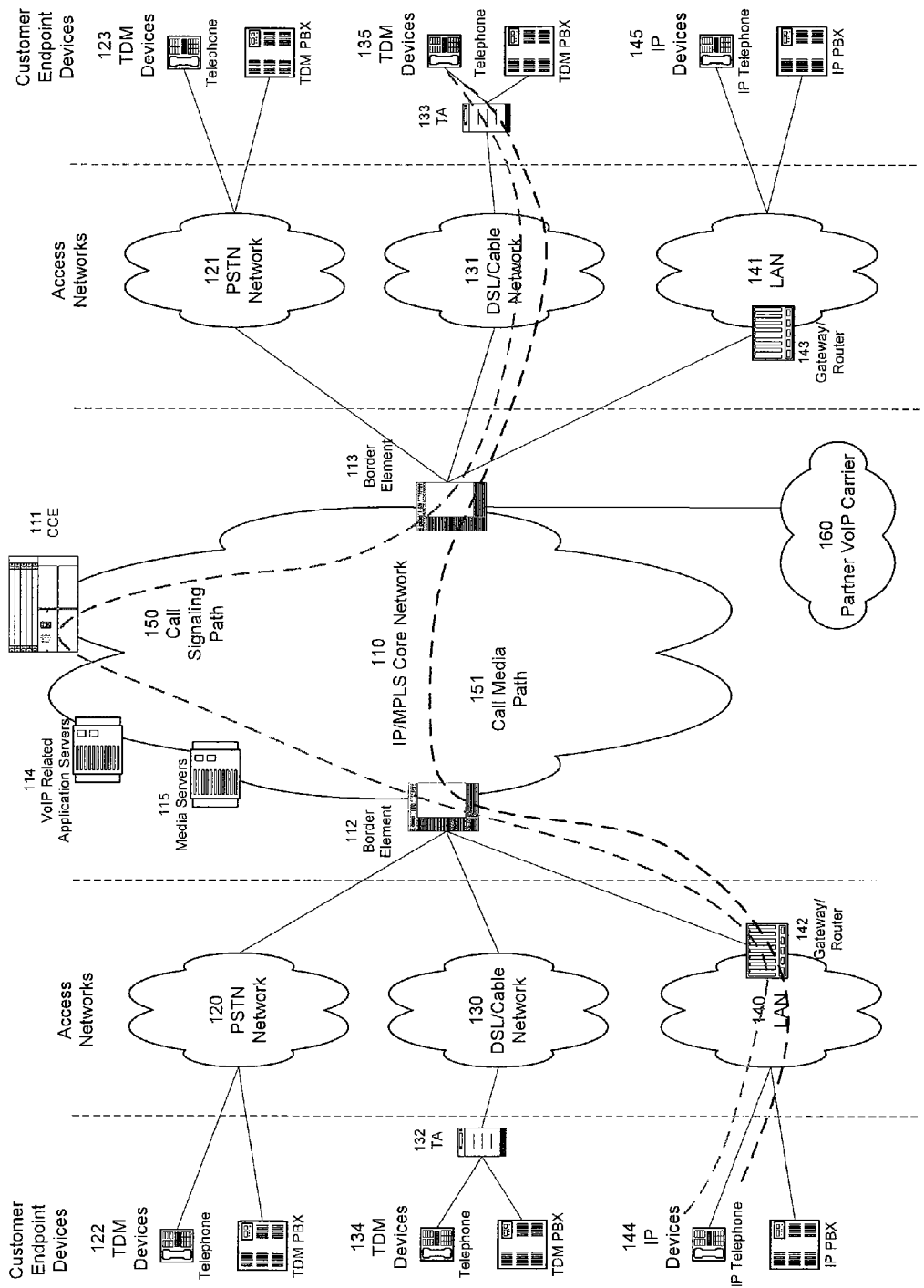
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Subscribers of VoIP services sometimes choose telephone numbers outside of their geographical local calling area. Enhanced 911 (E911) services, however, require that the subscriber's telephone number and service address must be based in the same local calling area. For instance, subscribers must be assigned a phone number that is within the local calling area of subscriber's registered service address. When subscribers choose a phone number outside of their local calling area based on their service addresses, these subscribers are not eligible for E911 services. More importantly, the ineligibility of E911 services prevents subscribers with out of area phone number from receiving help using their subscribed VoIP services in an emergency situation.

To address this criticality, the present invention enables a single shadow numbers to be associated with one or more out of area phone numbers that have registered service addresses in the same local area. For instance, if multiple subscribers with service addresses within the same local calling area choose to use out of area phone numbers, these multiple out of area phone numbers will all be associated with a single shadow phone number that is local within the local calling area. In other word, if 20 subscribers in Middletown, N.J., subscribe to out of area phone numbers, these out of area phone numbers will all be associated with a single shadow phone number that comprises an area code and an exchange code that is within the local calling area of Middletown, N.J. When a subscriber using an out of area phone number places a call for emergency service, e.g., an E911 call, the out of area phone number as well as the associated shadow number will be sent to the E911 PSAP. Since telephone numbers are precious commodities that are limited in supply, the present invention enables a single shadow phone number to be associated with all out of area subscribers within a single local calling area. The shadow number is used only for routing E911 calls to the right PSAP; therefore, the shadow phone number does not have to be unique and can be associated with multiple out of area numbers as long as registered service addresses of the out of area phone numbers belong to the same local calling area.

Figure 2:
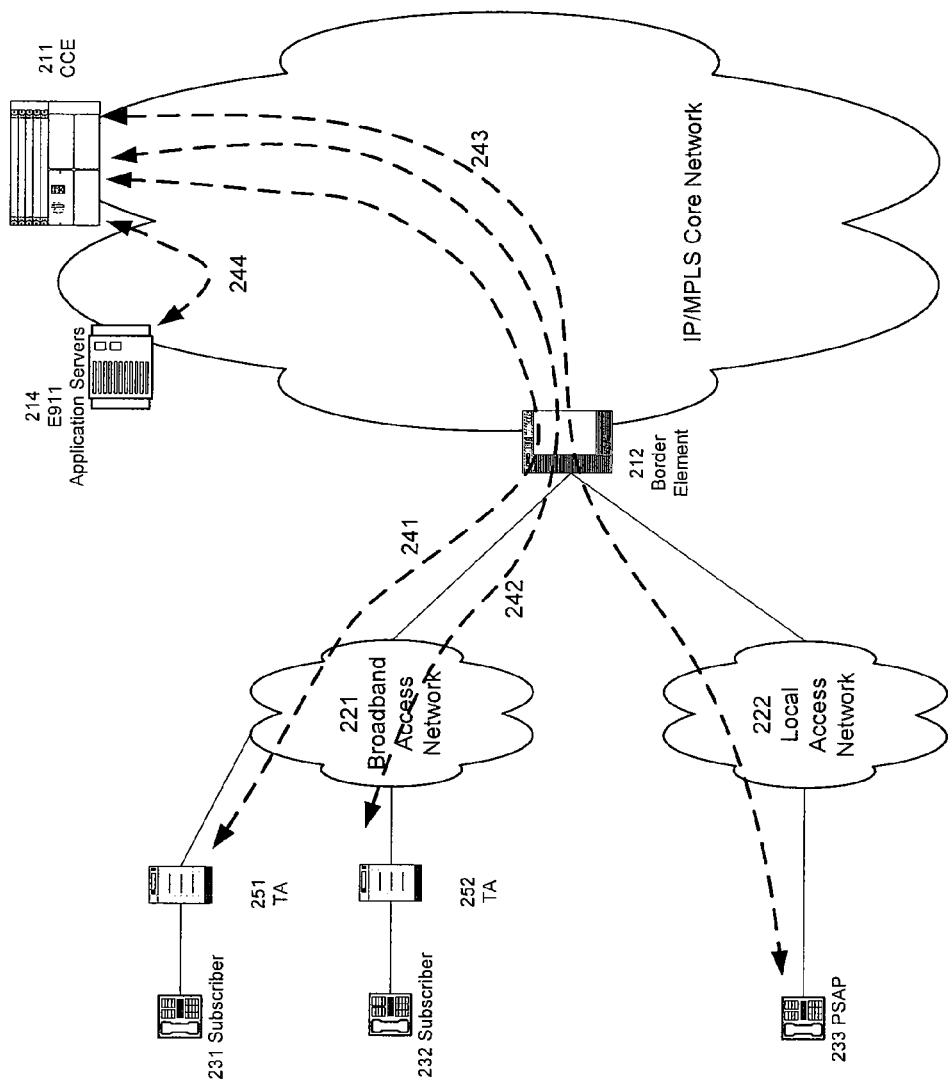
FIG. 2 illustrates an example of enabling a single local phone number for routing out of area phone numbers to the correct Public Safety Answering Point (PSAP) in a VoIP network of the present invention.

FIG. 2 illustrates an exemplary communication architecture 200 for enabling a single local phone number for routing out of area phone numbers to the correct Public Safety Answering Point (PSAP) in a packet network, e.g., a VoIP network of the present invention. In FIG. 2, subscriber 231 and subscriber 232 both reside in the same local area served by local access network 222 and PSAP 233. Subscriber 231 and subscriber 232 uses TA 251 and TA 252 respectively to access VoIP services via broadband access network 221 in the same local area. In other words, the registered service addresses of subscriber 231 and subscriber 232 are also in the same local area served by local access network 222. Subscriber 231 and subscriber 232, however, have chosen to use out of area phone numbers that do not correspond to the local calling area served by local access network 222; hence, their numbers appear to be out of area numbers even though the VoIP endpoints are located in the local calling area served by local access network 222. The out of area phone numbers assigned to subscriber 231 and subscriber 232 are associated with a shadow phone number that belongs to the local calling area of the subscribers' service addresses. Note that a single shadow phone number can be associated with multiple subscribers' phone numbers with service addresses in the same local calling area; therefore, only a single shadow phone number needs to be assigned for each local calling area.

When subscriber 231 places an E911 call to the VoIP network via broadband access network 221 and BE 212 using signaling flow 241, CCE 211, upon receiving the E911 call setup message, will communicate with E911 AS 214 using signaling flow 244 to find out that the phone number of subscriber 231 is an out of area phone number and to obtain the pre-assigned shadow phone number associated with the phone number of subscriber 231. The shadow phone number is a phone number that corresponds to the local calling area served by local access network 222. Note that local access network is typically a PSTN network serving a local calling area. CCE 211 then uses the shadow phone number which is within the local area served by PSAP 233 to send the E911 call setup message to PSAP 233 using signaling flow 243. The E911 call setup message comprises the service address of subscriber 231 and the out of area phone number of subscriber 231.

Similarly, when subscriber 232 places an E911 call to the VoIP network via broadband access network 221 and BE 212 using signaling flow 242, CCE 211, upon receiving the E911 call setup message, will communicate with E911 AS 214 using signaling flow 244 to find out that phone number of subscriber 232 is an out of area phone number and to obtain the pre-assigned shadow phone number associated with the phone number of subscriber 232. Note that the same shadow phone number is associated with both subscribers 231 and 232. The shadow phone number is a phone number that corresponds to the local calling area served by local access network 222. Note that local access network is typically a PSTN network serving a local calling area. CCE 211 then uses the shadow phone number which is within the local area served by PSAP 233 to send the E911 call setup message to PSAP 233 using signaling flow 243. The E911 call setup message comprises the service address of subscriber 232 and the out of area phone number of subscriber 232.

Figure 3:
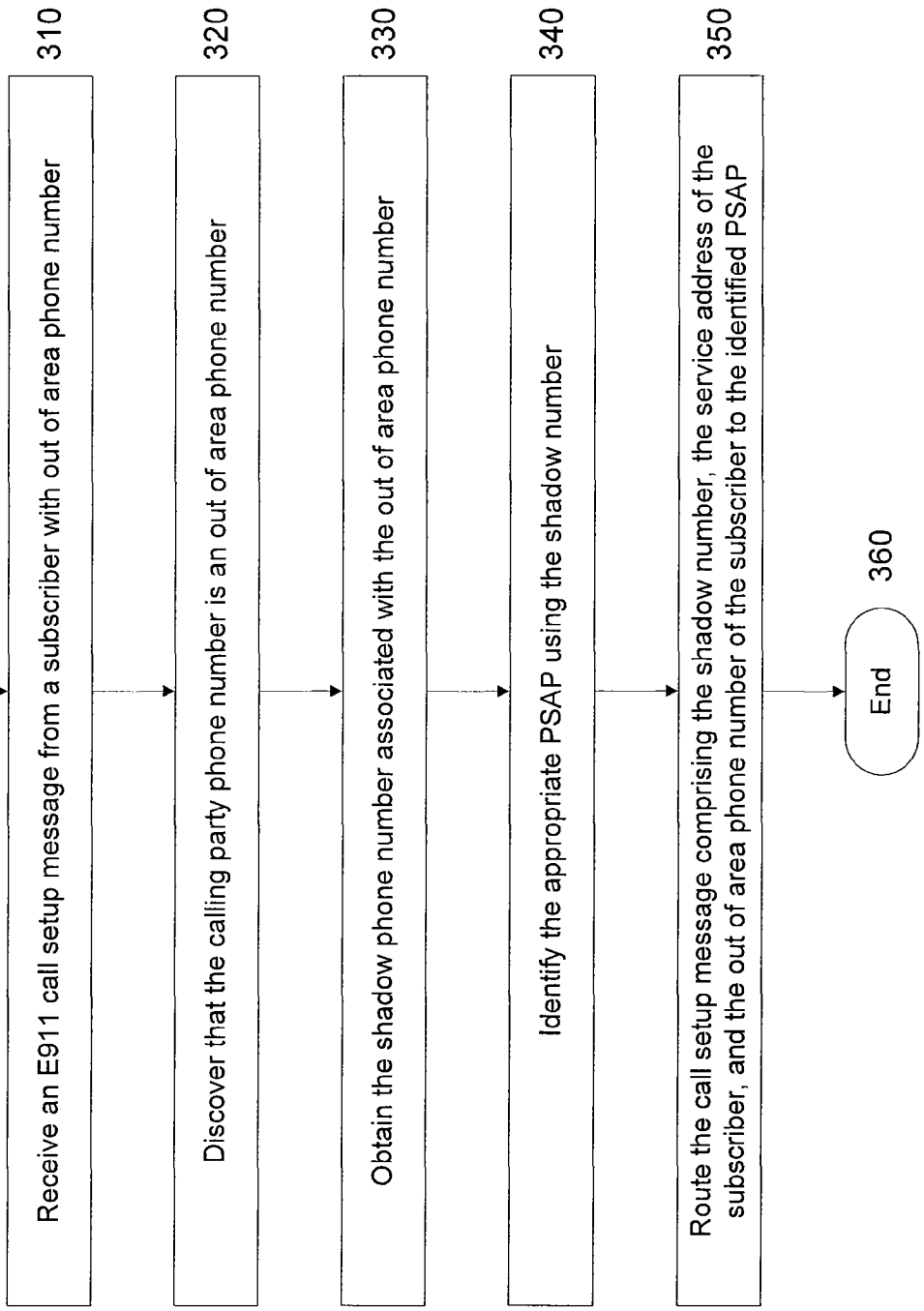
FIG. 3 illustrates a flowchart of a method for enabling a single local phone number for routing out of area phone numbers to the correct Public Safety Answering Point (PSAP) in a VoIP network of the present invention.

FIG. 3 illustrates a flowchart of a method 300 for providing a single local phone number for routing out of area phone numbers to the correct Public Safety Answering Point (PSAP) in a packet network, e.g., a VoIP network of the present invention. Method 300 starts in step 305 and proceeds to step 310.

In step 310, the method receives an E911 call setup message from a subscriber using an out of area phone number. The out of area phone number is the calling phone number.

In step 320, the method discovers that the calling party phone number, i.e. the subscriber's phone number, is an out of area phone number.

In step 330, the method obtains the pre-assigned shadow phone number that is associated with the subscriber's phone number. Note that a single shadow phone number can be associated with multiple subscribers' phone numbers with service addresses in the same local calling area. Therefore, only a single shadow phone number needs to be predefined for each local calling area.

In step 340, the method identifies the appropriate PSAP to handle the E911 call using the obtained shadow phone number.

In step 350, the method routes the call setup message comprising the subscriber's service address and the subscriber's out of area phone number to the identified PSAP to handle the E911 emergency call. The method ends in step 360.

Figure 4:
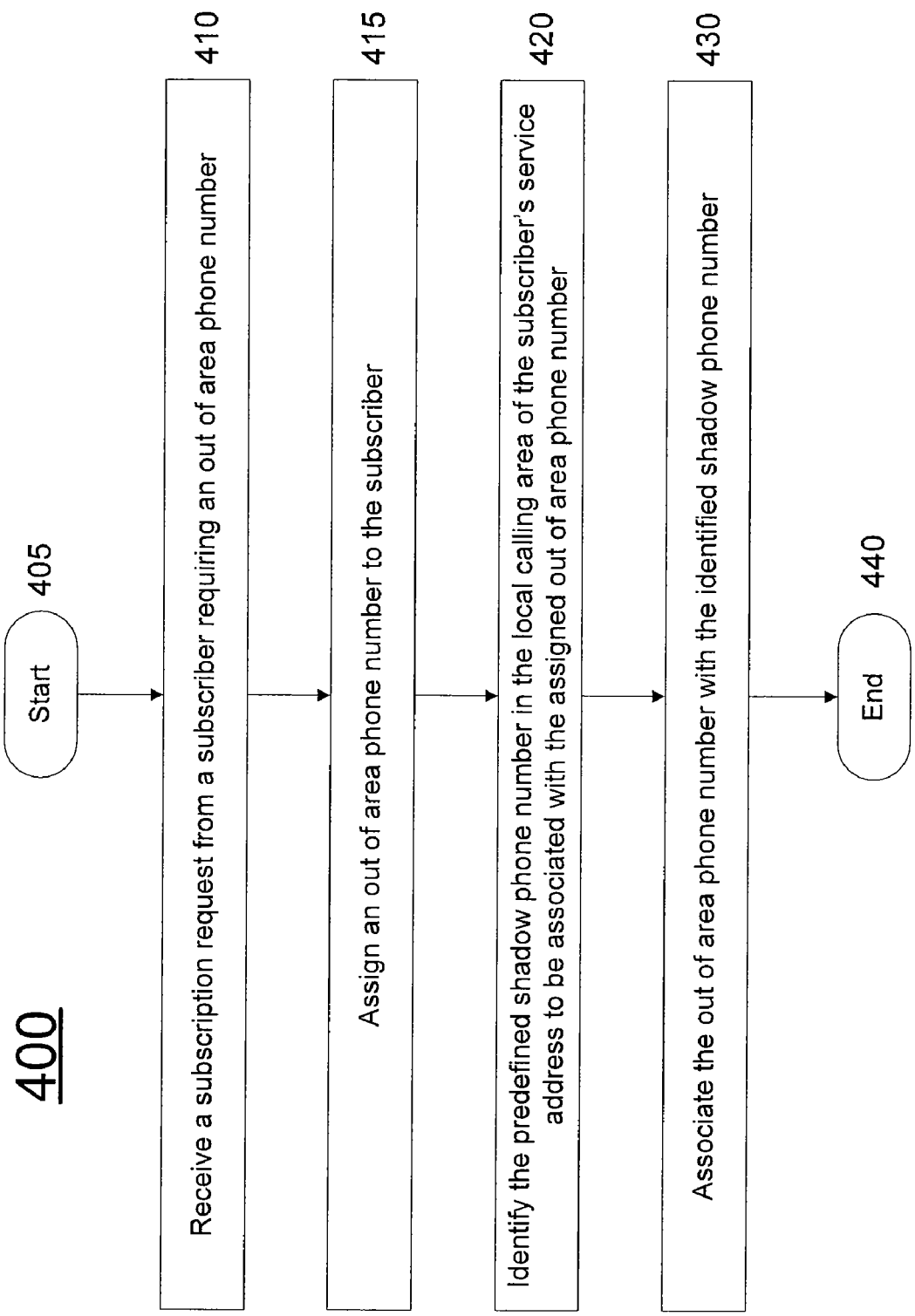
FIG. 4 illustrates a flowchart of a method for assigning a single local phone number for routing out of area phone numbers to the correct Public Safety Answering Point (PSAP) in a VoIP network of the present invention.

FIG. 4 illustrates a flowchart of a method 400 for assigning a single local phone number for routing out of area phone numbers to the correct Public Safety Answering Point (PSAP) in a packet network, e.g., a VoIP network of the present invention. Method 400 starts in step 405 and proceeds to step 410.

In step 410, the method receives a subscription request from a subscriber requiring an out of area phone number.

In step 415, the method assigns an out of area phone number to the subscriber.

In step 420, the method identifies the pre-assigned shadow phone number in the local calling area of the subscriber's service address to be associated with the assigned out of area phone number. Note that a single shadow phone number can be associated with multiple subscribers' phone numbers with service addresses in the same local calling area. Therefore, only a single shadow phone number needs to be predefined for each local calling area.

In step 430, the method associates the identified shadow phone number with the assigned out of area phone number. The method ends in step 440.

Figure 5:
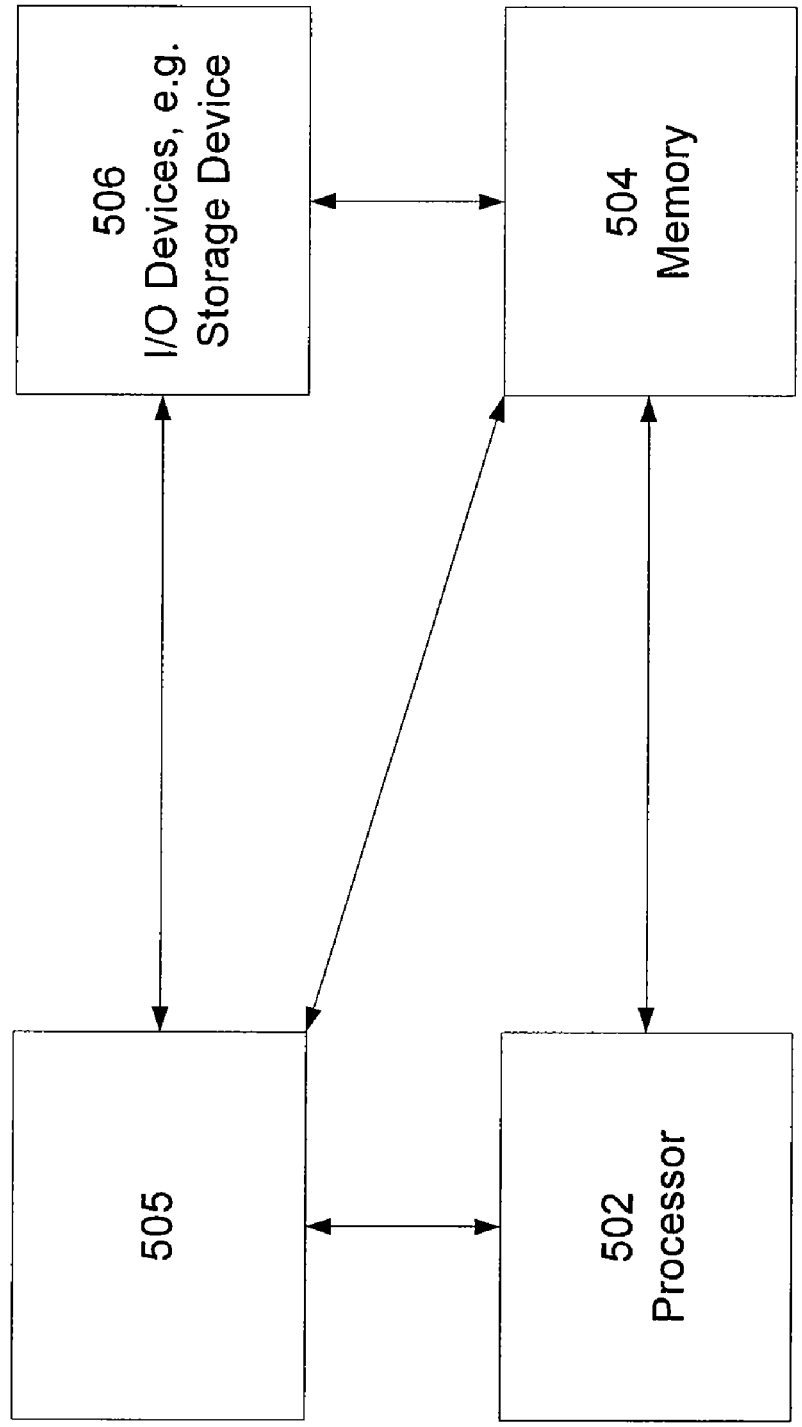
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing a single local phone number for routing out of area phone numbers to the correct PSAP, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing a single local phone number for routing out of area phone numbers to the correct PSAP can be loaded into memory 504 and executed by processor 502 to implement the functions as discussed above. As such, the present process 505 for providing a single local phone number for routing out of area phone numbers to the correct PSAP (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for routing a call to a public safety answering point in a communication network, comprising:

receiving a call setup message for emergency service by the communication network, where the call setup message is associated with a calling phone number;

determining the calling phone number is associated with a single local shadow phone number for a local calling area, where the single shadow phone number is shared among a plurality of subscribers, wherein the shadow number is obtained from an enhanced 911 application server; and routing the call setup message to the public safety answering point using the shadow phone number.

2. The method of claim 1, wherein the communication network is an internet protocol network.

3. The method of claim 1, wherein the calling phone number is an out of area phone number that is assigned to a subscriber with a service address residing within the local calling area.

4. The method of claim 1, wherein the call setup message for emergency service comprises an enhanced 911 call setup message.

5. The method of claim 1, wherein the public safety answering point is identified by) the enhanced 911 application server.

6. The method of claim 1, wherein the call setup message for emergency service comprises a service address and the calling phone number.

7. A computer-readable medium having stored thereon a plurality of instructions, the plurality of instructions including instructions which, when executed by a processor, cause the processor to perform a method for routing a call to a public safety answering point in a communication network, comprising:

receiving a call setup message for emergency service by the communication network, where the call setup message is associated with a calling phone number;

determining the calling phone number is associated with a single local shadow phone number for a local calling area, where the single shadow phone number is shared among a plurality of subscribers, wherein the shadow number is obtained from an enhanced 911 application server; and routing the call setup message to the public safety answering point using the shadow phone number.

8. The computer-readable medium of claim 7, wherein the communication network is an internet protocol network.

9. The computer-readable medium of claim 7, wherein the calling phone number is an out of area phone number that is assigned to a subscriber with a service address residing within the local calling area.

10. The computer-readable medium of claim 7, wherein the call setup message for emergency service comprises an enhanced 911 call setup message.

11. The computer-readable medium of claim 7, wherein the public safety answering point is identified by the enhanced 911 application server.

12. The computer-readable medium of claim 7, wherein the call setup message for emergency service comprises a service address and the calling phone number.

13. An apparatus for routing a call to a public safety answering point in a communication network, comprising:

a call control element configured to:

receive a call setup message for emergency service by the communication network, where the call setup message is associated with a calling phone number;

determine the calling phone number is associated with a single local shadow phone number for a local calling area, where the single shadow phone number is shared among a plurality of subscribers, wherein the shadow number is obtained from an enhanced 911 application server; and route the call setup message to the public safety answering point using the shadow phone number.

14. The apparatus of claim 13, wherein the communication network is an internet protocol network.

15. The apparatus of claim 13, wherein the calling phone number is an out of area phone number that is assigned to a subscriber with a service address residing within the local calling area.

16. The apparatus of claim 13, wherein the call setup message for emergency service comprises an enhanced 911 call setup message.

17. The apparatus of claim 13, wherein the public safety answering point is identified by the enhanced 911 application server.

18. The apparatus of claim 13, wherein the call setup message for emergency service comprises a service address and the calling phone number.

* * * * *